Jan. 25, 1955     E. H. BLATTNER     2,700,454
ONE-PIECE SELF-LOCKING CENTER PIN
Filed Dec. 13, 1950

Inventor:
Emil H. Blattner
By George F. Vaia
his Attorney

United States Patent Office 2,700,454
Patented Jan. 25, 1955

2,700,454
ONE-PIECE SELF-LOCKING CENTER PIN

Emil H. Blattner, Buffalo, N. Y., assignor to The Symington-Gould Corporation, Depew, N. Y., a corporation of Maryland Application December 13, 1950, Serial No. 200,513

8 Claims. (Cl. 105—200)

This invention pertains to a one piece self-locking center pin for railway trucks.

An object of the invention is the provision of an improved center pin arranged to function as a positive connection between a truck bolster and a body bolster of a railway truck.

Another object of the invention is the provision of an improved truck and body bolster connection employing a one piece center pin which is integral in character and is so arranged and constructed as to become self-locking to prevent an unwarranted, accidental separation of the body and truck bolsters.

A further object of the invention is the provision for a truck and body bolster connection of a center pin which is symmetrical about its transverse center line for simplicity of manufacture and reversibility, the latter preventing misapplication of the center pin.

A more detailed object of the invention is the provision of a center pin having at a spaced distance, outstanding, integrally formed wings which function as positive shear lugs to prevent an unwarranted or accidental separation of a body bolster and truck bolster.

The above and numerous other objects of the present invention will become apparent from the succeeding description considered with the showing of the accompanying drawings, wherein.

Figures 1, 2, 3, 4, 5, 6, 7:
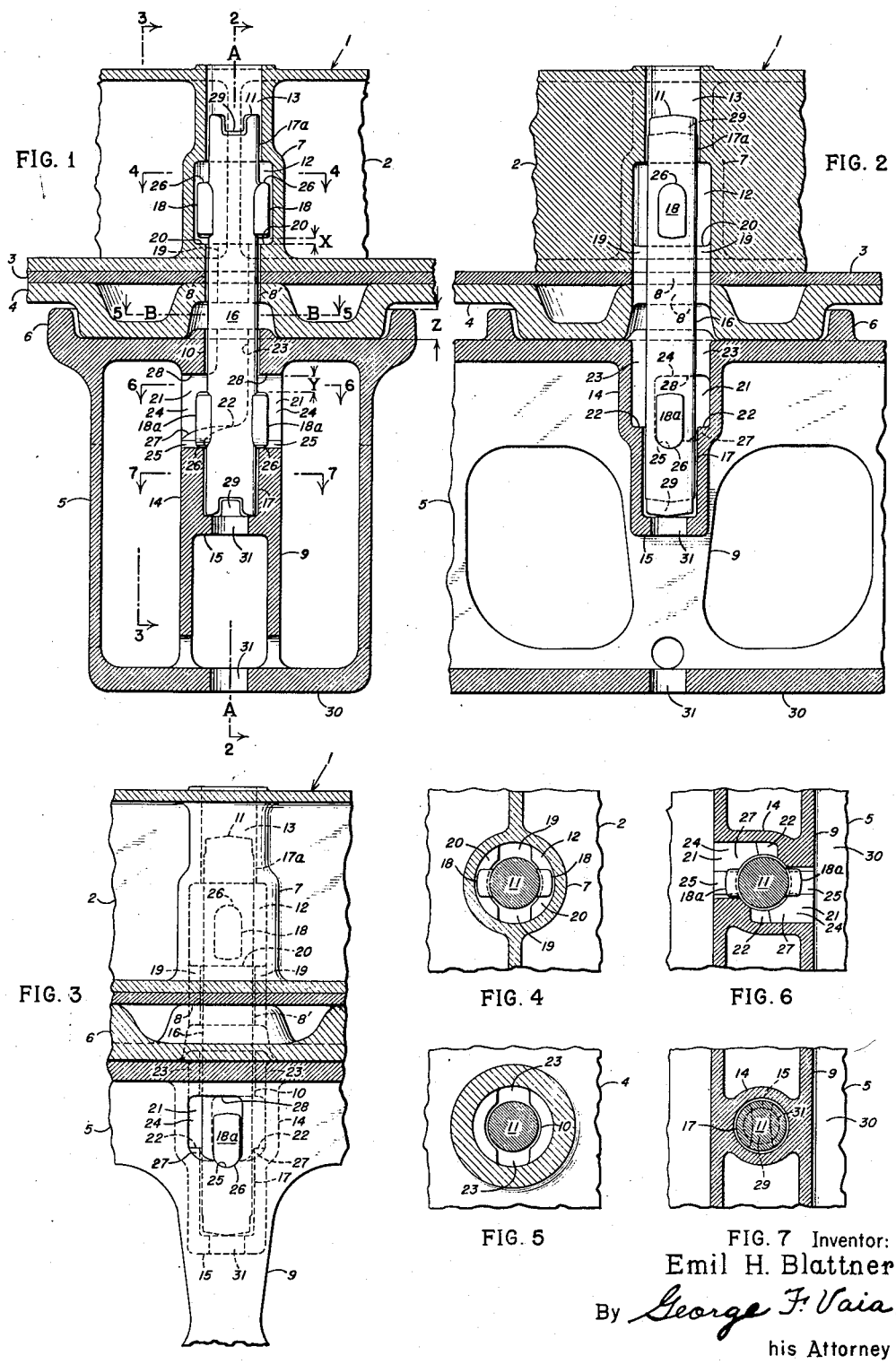
Figure 1 is a vertical cross-sectional view taken through an illustrative form of the present invention.
Figure 2 is a partial vertical sectional view and partial elevational view taken along the lines 2—2 of Figure 1 looking in the direction of the arrows.
Figure 3 is a sectional view taken along the lines 3—3 of Figure 1 looking in the direction of the arrows.

Figures 4, 5, 6 and 7 are horizontal sectional views taken along the lines 4—4, 5—5, 6—6 and 7—7, respectively, of Figure 1 looking in the direction of the arrows.

Referring now in detail to the several figures of the drawings wherein like reference characters indicate like parts, the numeral 1 is employed, in a somewhat general manner, to designate an arrangement exemplifying the present invention. Also considered generally, the arrangement comprises a body bolster 2, only a pertinent part of which is illustrated in the drawings, to which there may be secured, in subjacent relation a bottom tie plate 3. While the bottom tie plate may be optional in the carrying out of the present invention, a body center plate 4, however, is a necessary component of the arrangement and such body center plate is secured to the bottom tie plate, if one is present, and the body bolster so as to form, for all purposes, an integral part of the body bolster. The body bolster, bottom tie plate and body center plate are, as is well recognized, all components of a car body (not shown) and such car body is carried adjacent each end, by a railway truck, only a pertinent portion of a truck bolster 5 of which is illustrated in the drawings. Also considered generally the truck bolster is provided with a truck center plate 6 shown in the drawings as an integrally cast component of the truck bolster and in load supporting relation with the body bolster. The body center plate, as illustrated, nests in or is received by the truck center plate and since both of these center plates are circular in plan they are arranged, therefore, to pivot about a common axis indicated in Figure 1 by the diagrammatic line A—A and as such the center plates are somewhat freely rotative relative to one another about the common axis above indicated.

The body bolster is provided with a vertical, central hollow post 7 formed about the axis A—A and in axial alignment with this post there are suitable apertures 8—8' in the bottom tie plate and body center plate, respectively. The truck bolster is, in like manner, provided with a vertical, central, hollow stanchion 9 in axial alignment with the axis A—A so as to be aligned with the post. Opening into the stanchion through the top of the truck center plate is an aligned opening or aperture 10 which, of course, also places this opening in axial or vertical alignment with the apertures 8 and 8' and the hollow post.

With this arrangement so far considered an ordinary straight shanked pin (not illustrated) may or could be used to function as a center pin and the construction so far described would operate as intended; that is to say, the center plates would rotate relative to one another. In such instance there may or may not be any locking components associated with the center pin.

It is exceedingly desirable, in structures of the present type, to prevent an absolute vertical and horizontal separation of the center plates. The chief reason for this is that during a severe collision of one railway car with another, the meeting cars tend to telescope and such telescopic action may only amount to the adjacent ends of the colliding cars being raised vertically by a distance sufficient to have the body center plate rise above the truck center plate to be absolutely clear of the confinement of the latter and any subsequent forces tending to move the body center plate horizontally would result in a complete separation of the center plates. This, therefore, would further result in the railway truck not being in a proper supporting or receiving position when the car body or body center plate subsequently dropped. In such eventuality, further property damage would be the ultimate result.

The present invention has to do with limiting a vertical separation of the center plates and preventing, in any eventuality, a horizontal separation of the center plates. Toward the accomplishment of the above there is provided on the vertical axis A—A, an improved center pin 11 which, as will be more clearly hereinafter brought out, is of an integral, self-locking type. Heretofore, most center pins for use with bolster structures were of the multipart type which necessitated somewhat of a complication in construction and application. With the use of the present structure no additional components are required to render the center pin an effective positive locking pin arranged for association with bolsters.

The body bolster post is provided with a substantially cylindrical pocket or casing 12 intermediate the vertical heights of the post and in substantial vertical alignment with the axis A—A or apertures 8 and 8'. Further, it might be stated that the apertures 8 and 8' lead into the pocket to its lowermost extremity. Also for a completion of the description of the body bolster post, there is present therein a reduced neck portion or canal 13 which leads vertically and axially, from the pocket to the upper limits of the post; for which see particularly Figure 1 of the drawings.

The truck bolster stanchion is formed mainly by a cylindrical side wall 14 which extends preferably downwardly from the center plate portion to a location intermediate the height of the bolster where it is partially closed by a horizontal wall 15. This cylindrical side wall 14 is also in axial alignment with the axis A—A and, therefore, the aperture 10 leads into this structure and is in axial alignment therewith.

The improved center pin is preferably symmetrical about its transverse center line, the latter of which is indicated by the diagrammatic line B—B, see Figure 1. This symmetry of design is preferred for various reasons, among which is the simplicity of manufacture and a misapplication of the center pin is positively impossible. The center pin has a central shank or staff 16 extending a predetermined distance on each side of the transverse center line. This central shank is cylindrical in design and extends through the apertures 8, 8' and 10 so as to present a component extending from the area of the casing 12 to the side wall 14. Further, the central shank is of a diameter less than the diameter of the occupied apertures by a predesignated amount to afford a permissible horizontal shifting of one center plate relative to the other center plate and as such be relieved normally of shear forces. The central shank continues in both directions to merge with what may be considered as top and bottom end sections 17a and 17, respectively. The top end section 17a occupies, in somewhat of a loose fit, the reduced neck portion of the body bolster post while the bottom end section 17 extends to the bottom of the cylindrical side wall to rest or bear upon the horizontal wall 15.

Arranged intermediate the ends of the center pin in longitudinal spaced relation are outstanding wings, abutments or lugs 18 and 18a. The lugs 18 are arranged at an upper portion of the center pin and the lugs 18a are positioned at a lower portion of the center pin. The wings at each of the portions of the pin are diametrically disposed to outstand from the pin as substantial counterparts of one another. The lugs 18 are at a location on the pin so that the former may be positioned in the body bolster casing in an assemblage. It will be noted that the wings 18 and casing are such that a free rotative movement therebetween may be executed during service. Also, since the overall width of the lugs 18 is greater than the diameter of the apertures 8 and 8' these apertures have extending therefrom, radial slots 19 which are preferably diagonally disposed. The upper half of the center pin is associated with the body bolster by threading the upper top end section through the apertures 8 and 8' with the lugs 18 aligned with the radial slots and a continued movement of the center pin will finally result in the upper half of the center pin extending into the reduced neck portion and the wings 18 will be within the confines of the casing 12. An axial rotation—about which more will be set forth hereinafter—of ninety degrees of the center pin will then position the wings 18 out of alignment with the slots. In this assembled relation it will be noted that the lugs 18 are in spaced relation to shoulders or abutments 20 forming the lowermost limits of the casing and upon a vertical separating action of the center plates the lugs 18 and shoulders will come into contact to prevent the center pin from moving out of the body bolster post.

The truck bolster stanchion, at a location between the center plate and bottom wall thereof, is provided with diagonally arranged ports or ducts 21 which may extend horizontally entirely through the side wall as illustrated but need not necessarily, so long as there is present in the stanchion, lower shelves or rests 22. These ducts, as will be apparent, present enlarged areas in the stanchion. Leading downwardly through the truck center plate radially from the opening 10 therein, are oppositely disposed slots 23 which extend downwardly to terminate in substantial horizontal alignment with the rests or shelves where they turn in the same counter clockwise direction into what might be termed chambers 24, a part of the lower extremities thereof being formed by the shoulders 22. Accordingly, in assembling the center pin with the bolsters, the center pin is first associated with the truck bolster, at which time the bottom end pin section will first be threaded through the aperture 10 to be followed by the wings 18a passing through the slots 23 until the wings 18a come to rest upon the shelves in the stanchion. The center pin is not at this time turned through the above recited arc of ninety degrees. With the center pin in this position the body bolster can then be lowered to the truck bolster and during this procedure the top end pin section will first be threaded through the apertures 8 and 8' to be followed by the wings 18 passing through the slots 19 until these wings are positioned in the pocket or casing 12 and the uppermost extremity of the pin is positioned in the neck portion or canal 13.

The lower extremities of the ports or ducts are preferably at a location below the rests and as such depressions or wells 25 are present in the stanchions with these wells being arcuate or concave in formation and in a receptive position below the shelves. Further, to revert to the wings of the center pin, it will be noted initially that the wings at each end portion of the center pin are counterparts of one another and this construction is preferred for the reasons above set forth. Accordingly, each wing is formed with a circular or convexly curved surface 26 with the curvature thereof being comparable to the curvature of the wells and further the curved portions of the wings face or are all exposed to a related free extremity of the center pin.

As the center pin is lowered into the truck bolster stanchion as above described, the pin will pass freely therethrough until such time as the wings 18a come to bear upon the rests or shelves and at this time it will be noted that the wings are in vertical alignment with the slots 19 and 23 and the center plates could be separated vertically. Also at this time it is to be noted that the body center plate 4 is fully mated with and supported by the truck center plate 6. The arrangement could, if desired, be placed in service in this condition and if so, the vibratory forces or impulses to which the structure is normally subjected in service would soon cause the wings 18a to be shaken off of the rests and proceeding downwardly along slides 27 which connect the shelves and wells, the wings would then become lodged in the wells and in so doing the pin would be automatically or selectively rotated about its axis for a value of approximately ninety degrees to thus carry the wings out of alignment with the escape slots. A further or counter rotation of the center pin is prevented by the curved surfaces of the wings 18a nesting in the wells. Thus the center pin is of a self-locking type and in the normal position just described an accidental or unwarranted, abnormal vertical separating movement of the center plates is positively prevented. Toward this end it will be noted that the sum of the distances X and Y is less than the distance Z (see Figure 1). That is to say, the telescoping value of the center plates represented by "Z" is in excess of the clearance between the lugs 18 and stop shoulders 20 in the body bolster plus the clearance between the wings 18a and the overlying arresting stops 28 so that at no time can the body center plate move out of alignment with the truck center plate.

Because of the necessity of, at times, separating the truck from the vehicle body, some means should be incorporated in the structure to accomplish this feature. Many means present themselves as adequate, however, the preferred and more simple means is reflected in the drawings by the provision of a cross-cut or groove 29 at each extreme end of the pin. While only one or the lowermost of these cross-cuts may be utilized at one time, to carry out the thought of symmetry to avoid a misapplication of the pin, a cross-cut is formed at both free ends of the pin. These cross-cuts open or are exposed outwardly and longitudinally of the pin and both the truck bolster horizontal wall 15 and truck bolster bottom wall 30 have formed therein aligned access openings 31. These access openings, as will be noted by referring particularly to Figure 1, are in vertical alignment with the lowermost cross-cut of the pin to expose this cross-cut. By the insertion of any tool (not shown) through the access openings and into the lowermost cross-cut, the pin may first be elevated until the wings 18a come to rest against the stops 28 then rotated so as to place the wings 18a on the rests 22 at which time the wings are in vertical alignment with the slots 19 and 23 and the arrangement may be easily separated.

From the above it will be noted that various changes and alterations may be made to the illustrated and described construction without departing from the spirit of this invention or scope of the appended claims.

I claim:

1. In a device for connecting truck and body bolsters having aligned pin-receiving openings, the combination of, a center pin having counterpart end portions each received in one of said openings, oppositely disposed wings outstanding from each of said end portions, slots in said bolsters and associated with said openings for the introduction of said wings thereinto, stop means in said bolsters and engageable by said wings on movement thereof to a position out-of-line with said slots for limiting a separating movement of said bolsters, and well means in one of said bolsters and engageable by certain of said wings for maintaining said center pin in locked said out-of-line position.

2. In a device for connecting truck and body bolsters having aligned pin-receiving openings, the combination of, a center pin having counterpart end portions each received in one of said openings, oppositely disposed wings outstanding from each of said end portions, slots in said bolsters and associated with said openings for the introduction of said wings thereinto, stop means in said bolsters and engageable by said wings on movement thereof out of alignment with said slots for limiting a separating movement of said bolsters, rests in said truck bolster in vertical alignment with said slots for temporary engagement by certain of said wings, and well means below and offset from said rests for the reception of said rest engaging wings to maintain said wings out of vertical alignment with said slots.

3. In a device for connecting truck and body bolsters having aligned pin-receiving openings, the combination of, a center pin having counterpart end portions each received in one of said openings, oppositely disposed wings outstanding from each of said end portions, slots in said bolsters and associated with said openings for the introduction of said wings thereinto, stop means in said bolsters and engageable by said wings on rotation of said pin to locked position for limiting a separating movement of said bolsters, rests in said truck bolster in vertical alignment with said slots for temporary engagement by certain of said wings, and concave means below and out of alignment with said rests for engagement by arcuate surfaces of said rest engaging wings in said locked position to maintain said wings out of vertical alignment with said slots.

4. In a device for connecting truck and body bolsters having aligned pin-receiving openings, the combination of, a self-locking center pin having a cylindrical central portion and counterpart end portions, said end portions each being receivable in one of said openings, oppositely disposed wings outstanding from each of said end portions, slots in said bolsters and associated with said openings for the introduction of said wings into said bolsters, stop means in said bolsters and engageable by said wings on rotation thereof to locked postiion for limiting a separating movement of said bolsters, rests in said truck bolster in vertical alignment with said slots for temporary engagement by some of said wings, seat means spaced below and horizontally from said rests for the reception of arcuate surfaces on said rest engaging wings in said locked position to maintain said wings out of alignment with said slots, and guideways between said rests and seat means for guiding said wings to said locked position.

5. In a device for connecting truck and body bolsters having aligned pin-receiving openings, the combination of, a center pin having a cylindrical central portion and counterpart end portions, said end portions each being receivable in one of said openings, oppositely disposed wings outstanding from each of said end portions, slots in said bolsters and associated with said openings for the introduction of said wings into said bolsters, stop means in said bolsters and engageable by said wings on rotation thereof to locked position for limiting a separating movement of said bolsters, and means in said truck bolster out of vertical alignment with said slots for the engagement of adjacent wings; said means on initial relative rotation of said pin engaging said wings and locking said pin and truck bolster against unwarranted relative rotative movement.

6. In a device for connecting truck and body bolsters having aligned pin-receiving openings, the combination of, a self-locking center pin having a cylindrical central portion and counterpart end portions, said end portions each being receivable in one of said openings, oppositely disposed wings outstanding from each of said end portions, slots in said bolsters and associated with said openings for the introduction of said wings into said bolsters, stop means in said bolsters and engageable by said wings on rotation thereof to locked position for limiting a separating movement of said bolsters, substantially flat rests in said truck bolster in vertical alignment with said slots for temporarily supporting adjacent of said wings cup-shaped means in said truck bolster below and out of vertical alignment with said rests for the reception of correspondingly formed surfaces on said adjacent wings to lock said pin against rotation relative to said truck bolster and guide means connecting said rests and cup-shaped means for camming said wings to locked position on displacement thereof from said rests.

7. In a device for connecting truck and body bolsters having aligned pin-receiving openings, the combination of, a self-locking center pin having a cylindrical central portion and counterpart end portions, said end portions each being receivable in one of said openings, oppositely disposed wings outstanding from each of said end portions, slots in said bolsters and associated with said openings for the introduction of said wings into said bolsters, stop means in said bolsters and engageable by said wings on rotation thereof to locked position for limiting a separating movement of said bolsters, well means in said truck bolster out of alignment with said slots for the reception of certain of said wings to prevent relative rotation of said center pin and truck bolster, and means on said center pin enabling displacement of said certain of said wings out of said well means and rotation of said pin to place said wings in vertical alignment with said slots.

8. In a device for connecting truck and body bolsters having aligned pin-receiving openings, the combination of, a self-centering pin having end portions receivable in each of said openings, oppositely disposed wings outstanding from said truck bolster end portion of said pin, slots in said truck bolster and associated with said opening therein for the introduction of said wings thereinto, stop means in said truck bolster and engageable by said wings on rotation of said pin for limiting a separate movement therebetween, substantially flat rests in said truck bolster in alignment with said slots for temporarily supporting said wings, means in said truck bolster below and out of alignment with said rests and engageable with said wings for locking said pin and truck bolster against accidental relative rotation, and guideways connecting said rests and locking means for camming said wings into engagement with said locking means on initial vibratory displacement of said wings from said rests.

References Cited in the file of this patent

UNITED STATES PATENTS 2,463,343    Williams   ---------------- Mar. 1, 1949